United States Patent [19]

Benedetto et al.

[11] 4,044,956
[45] Aug. 30, 1977

[54] MECHANICAL METHOD FOR SEPARATING FRACTIONS OF INCINERATED URBAN REFUSE OR SIMILAR INDUSTRIAL REFUSE

[75] Inventors: Alexandre Benedetto, Marseille; Roger O. Cuvillier, Jargeau, Orleans; Jean-Noël Gony, Orleans, all of France

[73] Assignee: Bureau de Recherches Geologiques et Minieres, Paris, France

[21] Appl. No.: 666,374

[22] Filed: Mar. 12, 1976

[30] Foreign Application Priority Data

Mar. 12, 1975 France .................................. 75.07681

[51] Int. Cl.² .............................................. B02C 23/14
[52] U.S. Cl. ......................................... 241/24; 241/29; 241/76; 241/79.1; 241/DIG. 38
[58] Field of Search .................... 241/DIG. 38; 122/2; 110/7 B, 8 R, 8 C, 18 R

[56] References Cited

U.S. PATENT DOCUMENTS

| 3,579,320 | 5/1971 | Pesses | 241/DIG. 38 |
| 3,790,091 | 2/1974 | Law et al. | 241/DIG. 38 |
| 3,905,556 | 9/1975 | Drage | 241/DIG. 38 |

Primary Examiner—Granville Y. Custer, Jr.
Attorney, Agent, or Firm—Sughrue, Rothwell, Mion, Zinn and Macpeak

[57] ABSTRACT

A method for separating fractions of incinerated refuse with a high recuperation yield without requiring special equipment. A first portion of the separation process may be applied to either an initially dry or an initially wet refuse. The refuse is at first screened to a median size. The oversized fraction is crushed and shredded and the non-magnetic fraction separated therefrom is sent commonly to a grinding-rolling mill which also receives the undersize fraction. The undersize fraction downstream of the grinding mill is further treated by a wet separating process, the method achieving separation of ferrous and nonferrous metals, of glasses and silicates, and of magnetic slags.

10 Claims, 1 Drawing Figure

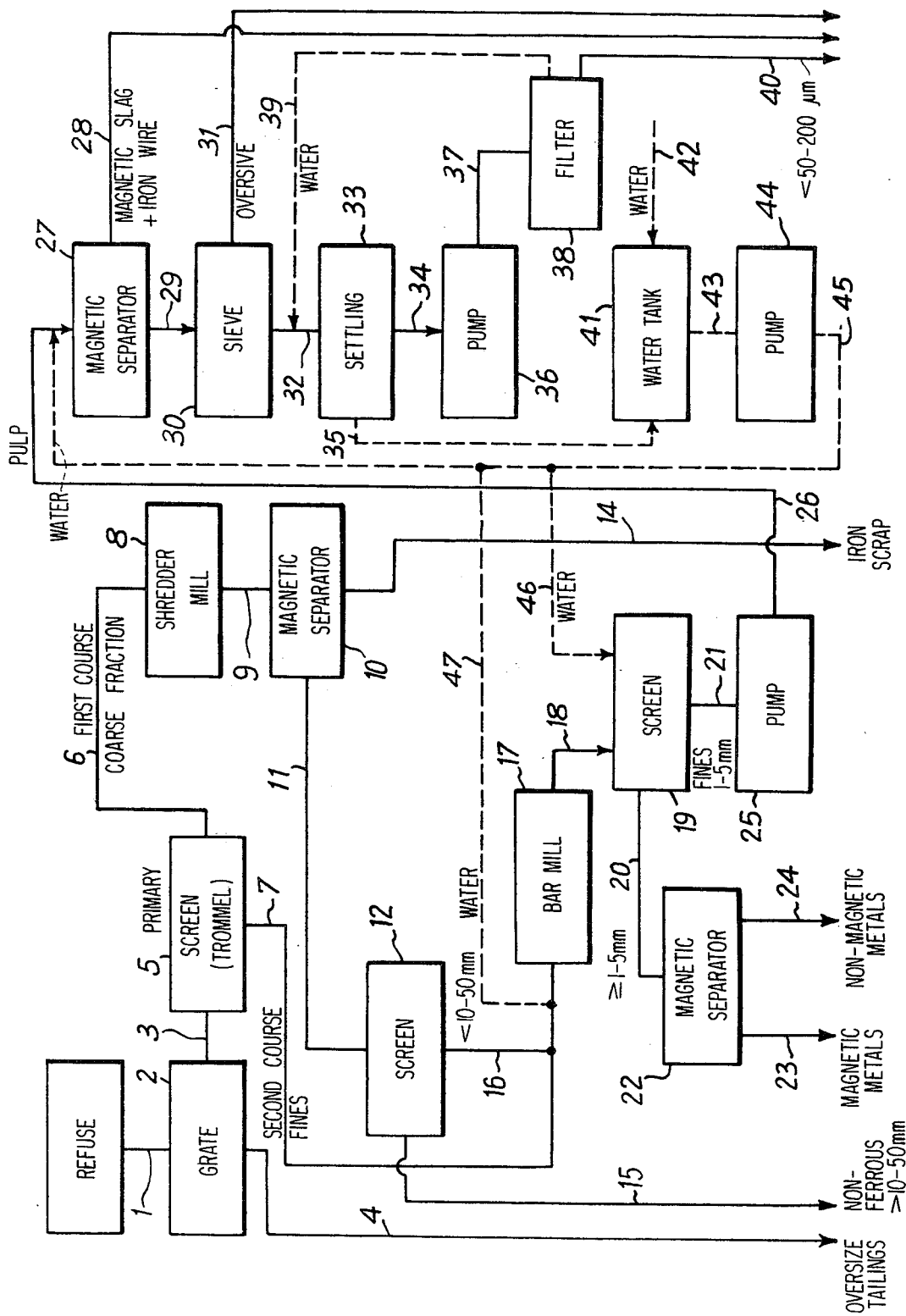

MECHANICAL METHOD FOR SEPARATING FRACTIONS OF INCINERATED URBAN REFUSE OR SIMILAR INDUSTRIAL REFUSE

BACKGROUND OF THE INVENTION

1. Field of the Invention

This invention relates to a method for separating fractions of urban refuse which has been incinerated, and/or fractions of industrial refuse of a similar kind, the purpose being to recuperate these fractions with a high recuperation yield without having to use special equipment.

2. Description of the Prior Art

Several prior methods are known for sorting out various fractions from urban or industrial refuse in order to extract magnetic and non-magnetic metals and the mineral fraction. However, these methods require costly investments and entail a large energy consumption, which is inherent to these methods. One very simple method is also known, which consists in passing the refuse through a percussion crusher-shredder, but it will only allow extracting ferrous scrap by magnetic separation and by comminuting the non-magnetic fraction to a grain size from 0 to 50 mm, this latter fraction being used after screening as a road-fill material or for underbed drainage in road-building. Thus, while this method requires only a small investment with moderate operating costs, it presents the major drawback of being able to concentrate solely magnetic metals.

A further handling of the non-magnetic fraction available from the magnetic separator may be considered, but experience shows that this fraction, with a grain size from 0 to 50 mm, does not lend itself, in any possible manner, to the recuperation of non-magnetic metals, nor to the extraction of glass wastes, nor to the reuse of slag in the production of earthenware, since every attempt towards this entails the addition of expensive equipment with a large and costly energy consumption.

As for the other methods, they provide for a better recuperation of the various fractions, but their operation costs are high, in addition to which they have the drawback of operating solely either through a dry process or through a wet process.

Two main cases are known at present.

In the first case, after screening out the coarser fractions, when required, the fractions passing through the sieve are dried, if needed, before undergoing a selective crushing along three successive stages in which the slag is pulverized and metals are shredded and flattened. The metals are then extracted by screening and by magnetic and gravimetric separations. This method requires a thorough elimination of dust and does not properly suit the nature of the product treated because incinerated refuse must be either sprayed with water or immersed in a water-filled tank to be extinguished and extracted from the kilns. Therefore, if the clinker is too damp, the drying operation becomes costly, or else, if it is too dry, dust removal must be carried out at many locations. Moreover, this method leaves no possibility for washing away the soluble salts contained in the ashes, the presence of which is detrimental to the production of earthenware products from these ashes.

In the second case, all the various fractions, metallic or other, of the incinerated refuse are effectively separated, but this is at the cost of a large number of operations, so that the stations where the various concentrates are produced are widely spread apart, which requires considerable handling and reworking of the refuse. Also, all the operations are exclusively "wet process" operation, which results in an excessive consumption of water at the screening stations and to an unavoidable repetition of operations for draining water out of the pulp and for repeated pulping.

Thus, there does not exist at present any method for sorting out the various fractions contained in incinerated urban refuse or in industrial refuse of similar nature, without consuming too much power, particularly where the clinker is too damp when it is to be treated by a dry process, or otherwise too much water is consumed when all the operations are "wet process" operations.

SUMMARY OF THE INVENTION

The present invention relates to a method for separating fractions of refuse of the kind considered while using conventional equipment for screening, crushing and magnetic separation, with a possible elimination of the bulkier components, the circulation of the products comprising a primary screening operation from which the coarser fraction is led along a first course through a crushing operation followed by a magnetic separation, a second course being provided for crushing and screening a part of the undersize fraction resulting from the primary screening, the non-magnetic fraction of the products treated along the first course being redirected so as to join the second course upstream of the crushing operation of said second course, whereby the thus reunited products are crushed together and are finally subjected to a wet-process magnetic separation.

CHARACTERISTICS OF THE INVENTION

This method is characterized by the following steps:
a. the coarse fraction from the primary screening is immediately and totally subjected to a percussion and shredding operation followed by a magnetic separation and a secondary screening, and
b. the finer fraction from the primary screening is immediately and totally subjected to a crushing and flattening operation together with the finer product obtained from the secondary screening of said coarse fraction, whereby there are separately extracted:
  a. at the end of the first course, the major part of the magnetic metals cleared from all cinders and also non-magnetic metals with sizes exceeding the first cut-off and rejected as oversize from the secondary screen of said first course, upstream of its junction with the second course, to form a common course,
  b. from the oversize fraction of a third screening made on the products resulting from the crushing and flattening operation, and as the outcome of a magnetic separation, each one of the magnetic and non-magnetic metal fractions having a size comprised between the first and last cut-offs, and, from the final screening, the fines which undergo a wet phase magnetic separation for the recovery of materials and being usable among other uses, for the preparation of earthenware.

According to a preferred embodiment of the invention, oversize material from the primary screening, the cut-off being from about 10 to 50 mm, is led along a first course where it is subjected to a differential crushing operation by percussion and shredding, followed by a magnetic separation. Undersize material follows a second course to a common course with the first course in which it is subjected to a differential crushing and flattening operation followed by a secondary screening.

At the end of the first course, the major part of the magnetic metals is extracted, while the non-magnetic fraction, comprising crushed slag and non-ferrous metals, is screened for extracting non-ferrous metal pieces bigger than the screen size, the finer fraction being fed to the common course upstream of the crushing station.

At the end of the common course, the products are screened, the course material with a grain size about 1 to 5 mm being separated into a magnetic fraction and a non-magnetic fraction, the residual fine fraction being further subjected to a wet-process magnetic separation.

It will be interesting to note that, in accordance with the nature of the refuse being treated, the method is applicable as a "dry-process" or as a "wet-process" method without any modification except possibly adding a pulping station in the case of a wet process or a drying station in the case of a dry process. It is pointed out that such crossovers from a wet process to a dry process or conversely are impossible with the known methods. This possiblity is of substantial advantage, since the same plant may then be adapted for treating a wider range of refuse types while maintaining an excellent efficiency for a smaller operating cost, when compared with prior methods.

Experience has further shown that the efficiency is preserved even for large variations in the percentages of glass and metallic fractions, since the greater part of the ferrous metals always pass along the first course for a cut-off size of about 10 to 50 mm, and the greater part of the products with a high contents in non-ferrous metals and glasses are always passing along the second course.

A further object of the invention relates to a modification of the above-described process making it possible to collect non-magnetic cinders of a size below 1 to 5 mm. This modification is characterized in that the crushing and flattening operation of the second course, and the associated screening operation may be carried out in the presence of water, the screened fraction with a size below 1 to 5 mm being subjected to a wet-process magnetic separation, and the non-magnetic fraction being sieved for directly recuperating the fraction with a size above 50 to 200 micrometers usable for the preparation of earthenware materials.

The advantage of this method lies in the possibility of recuperating a non-magnetic fraction which is directly available for the preparation of earthenware materials without requiring a preliminary pulping of all the unsorted initial material.

Yet another object of the invention is to extend the range of application of the above method to industrial residues of a nature similar to incinerated urban refuse, these residues containing therefore at least one magnetic fraction accompanied with a mineral fraction and a non-magnetic metallic fraction. This is achieved by modifying the cut-off values and selecting them in such manner that, during the primary screening, the percentage of magnetic metals in the oversize fraction may exceed at least 10% by weight of the total, and that the grain size ranges defined by this cut-off correspond, on the one hand, to the minimum size range acceptable for the percussion milling and shredding operation, and on the other hand to the maximum granulometry acceptable for the crushing and flattening operation.

Experience shows that in general a cut-off of about 10 to 50 mm can be maintained in very many cases and that the fractions considered may even contain practically none of some elements such as glass, for instance, without bringing about the need to modify equipment designed for treating urban refuse.

Other objects, features and advantages of the invention will be made apparent in the following description of a preferred embodiment which is provided by way of example only, with reference to the accompanying drawing which is a diagrammatic flow-sheet.

It should be understood that the various items of equipment may be of any known type and that all the circuits may be assembled from commercially available elements.

BRIEF DESCRIPTION OF THE PREFERRED EMBODIMENT

In the single diagrammatic FIGURE, urban and/or industrial refuse is delivered at station 1 and passes over a stationary grate 2 which eliminates bulkier components which are removed from the top of the grate as at 4. For this purpose, the spacing between elements of the gratings may be about 150 to 300 mm. The fraction passing through the grate is collected and pass as at 3 to screen 5 being screened, for instance by means of a trommel or any other suitable screening device. The granulometry of this screening process step is determined by experience. The average cut-off is such that the fraction collected in the screen and removed therefrom at 6 is oversize material of a size in excess of 10 to 50 mm. This fraction is characterized by its very high iron contents. It is fed along a first course to a shredder mill 8 subject to a differential crushing as in a percussion mill, such as a hammer mill, for instance, which pulverizes the non-metallic fraction of the cinders and shredds the metals. The crushed product is collected at 9 and then separated magnetically in magnetic separator 10. The iron scrap is collected at 14 from which it can be further separated into light and heavier fractions by pneumatic or other means. The non-magnetic fraction 11 leaves separator 10 and is characterized by the presence of pulverized slag resulting from the grinding occurring in mill 8 and of non-ferrous metals. This fraction 11 is then fed towards the second course, after a screening in screen 12 for extracting the non-ferrous metals which are removed at 15 having a size larger than 10 to 50 mm. Thus, the remainder of fraction from separator 10 along path 11 is fed towards the second course as at 16 and consists only of crushed slag with non-ferrous metals of a size smaller than 10 to 50 mm.

In parallel with the first course, products having passed through the primary screen 5 are fed as at 7 along the second course and to a common course, into a differential crusher-flattener or bar mill 17, through a screen 19 as at 18, with a grain size of about 1 to 5 mm, and through a magnetic separator 22 as at 20. Experience shows that when screening by screen 5 causes particles with an average size from 10 to 50 mm to pass, the fraction with the highest contents in non-ferrous metals and glass passes therethrough and is collected at 7. Crusher-flattener 17 is a bar-mill, or a ball-mill, or a similar type, which pulverizes the non-metallic fraction and flattens the metals. The crushed products are fed as at 18 into a vibrating screen 19, for instance. The oversize fraction from screen 19 is composed of metal pieces, with a size above 1 to 5 mm. These are fed through 20 to magnetic separator 22, from which the magnetic fraction is collected at 23 and the non-magnetic fraction at 24.

Fraction composed of fines below 1 to 5 mm passes through screen 19 and is pumped by means of the evacuation pump 25 through line 26 into a wet magnetic separator 27. The magnetic fraction separated by separator 27 and composed of magnetic slag with fragments of iron wire is collected and removed at 28 and the non-magnetic fraction passing therethrough as at 29 is fed to a sieve 30 with a cut-off between 50 and 200 microns, for instance. The oversize fraction is collected and removed at 31 while the fines are sent to a settling tank 33, from which they are sent to a filter 38 through lines 34, 37 and pump 36. The cake from this filter 38, having a size smaller than 50 to 200 microns, is collected and removed therefrom as at 40. The drawing shows at 42 a water supply line to a water tank 41, from which water flows through line 43, pump 44 and line 45 to the wet-process magnetic separator 27. A by-pass 35 returns water from the settling tank to the supply tank 41, while water from filter 38 returns via line 39 to the settling tank 33. Deviation lines 46 and 47 carry water respectively to crusher mill 17 and screen 19 from line 45.

Considering, as an example, one metric ton of refuse received in screening station 5, about 25 % of this is rejected as oversize and goes to the crusher-shredder percussion mill 8. This fraction contains about 80% ferrous scrap, while the remaining 75% of the initial product which passes through the screen has a higher content in slag, glass and non-ferrous metals. This fraction is enriched with the non-magnetic fraction coming from separator 10 through screen 12 so as to feed the bar-mill 17 with a product 16 from which coarse pieces of non-ferrous metals have been eliminated and the slag contents of which have been enriched. It thus becomes possible, when selecting an appropriate cut-off figure between 1 and 5 mm, to recuperate practically all the metals from the oversize fraction and practically all the slag and glass from the finer fraction.

In final account, in the example considered, with an average water consumption of 500 liters per metric ton of garbage treated, and an average energy consumption of about 15 to 20 kWh per ton, there are obtained respectively at 14 and 4, ferrous scrap fractions which may represent from 3 to 20% of the total initial weight, at 15 and 24 non-ferrous metals amounting from 0.1% to 2%, at 28 magnetic slag amounting from 4 to 10%, at 40 fine non-magnetic slag in an amount from 55 to 65%, this slag containing 16 to 32% glass material. All the above percentages relate to the weight of each fraction based on the total initial weight. All these fractions have a well determined granulometry and lend themselves immediately to the required conditions for industrial uses. This efficiency of separation can not be achieved in the same conditions with the prior methods, particularly when the moisture contents of the refuse varies from a very low minimum to more than 20%, while in the same time their magnetic metals content vary from 10 to 30% and their non-metallic phase composition varies from 70 to 90%.

It will be noted that the cut-off values indicated, namely 10 to 50 mm and 1 to 5 mm, may be modified, particularly in the case of industrial wastes, the essential condition being that the bigger size cut-off should be compatible both with the smallest size acceptable for the percussion and shredding operations and with the largest size acceptable for the bar-mill crushing and flattening operation.

It will further be noted that the magnetic separators used in accordance with the new method are not of the high-intensity type, so that paramagnetic products are not mixed with the magnetic products. As a result, a purified product is obtained, which finds a market in steelmaking operations and in cement factories.

We claim:
1. In a method for separating components of thermally degraded urban refuse and/or of industrial wastes of similar nature including the steps of primary screening of said refuse, and finally subjecting the primary screening fractions to a wet-process magnetic separation, the improvement comprising the steps of:
   a. immediately and totally subjecting the coarse fraction of said primary screening along a first course to a percussion crushing and shredding operation followed by a magnetic separation operation and a secondary screening, and
   b. directing the finer fraction of said primary screening along a second course and joining said first and second courses to form a combined course and subjecting said combined course to a crushing and flattening operation and further subjecting said common course to a third screening and subjecting the oversize fraction of the third screening to further magnetic separation, whereby there are separately extracted:
      1. at the end of the first course, the major part of the magnetic metals cleared of all cinders and also non-magnetic metals with sizes exceeding the first course fines and rejected as oversize from the secondary screening of said first course, upstream of its junction with said finer fraction,
      2. from the oversize fraction of the third screening made on the products obtained from said crushing and flattening operation in said combined course, and as the outcome of said further magnetic separation, both magnetic and non-magnetic metal fractions having a size comprised between the first course fines and the combined course fines, and from the third screening of said combined course, a combined course fines directed to a wet phase separation for the recovery of metals usable for the preparation of earthenware products.

2. A method as claimed in claim 1, wherein the operations made in the crushing and flattening step of said combined course are carried out in the presence of water.

3. A method as claimed in claim 1, further comprising the step of passing the non-magnetic finer fraction of the combined course through a sieve for directly recuperating the combined course fraction fines of a size above 50 to 20 micrometers, this fraction being usable for the preparation of earthenware materials.

4. A method as claimed in claim 1 wherein the first course coarse fraction is comprised between 10 and 50 mm.

5. A method as claimed in claim 1 wherein the second course finer fraction is comprised between 1 and 5 mm.

6. A method as claimed in claim 1 which comprises selecting the first course screen size so that the oversize fraction from the primary screening contains at least 10% magnetic metals by weight.

7. A method as claimed in claim 6, wherein the second course finer fraction is comprised between 1 and 5 mm.

8. In a separation plant for separating components of thermally degraded urban refuse and/or of industrial wastes of similar nature, said plant comprising means for effecting primary screening of said refuse, means forming a first course for the coarser fraction from said primary screening, means forming a second course for said fines fractions from said primary screening and means for finally subjecting the fines from the combined fractions of both courses to a wet-process magnetic separator, the improvement wherein:

said means forming said first course comprises means for directly subjecting oversize material in the first course with a size above 10 to 50 mm as rejected by said primary screen to a differential percussion-shredder and to a magnetic separator, said means forming said second course comprises means for directing undersize material with a size below 10 to 50 mm passing through said primary screen to a differential crusher and flattener mill, and said plant further comprises means for feeding the non-magnetic products in the first course through a second screen and thence to the second course for merger into a combined course at the entrance to the crusher-flattener mill, with the material passing through said first course screen being of a size less than 10 to 50 mm.

9. The separation plant as claimed in claim 8, wherein said combined course further comprises a vibratory screen between the differential crusher-flattener mill and the magnetic separator and means for feeding material passing through said vibratory screen to said wet-process magnetic separator, and means for sieving the non-magnetic fraction separated by said wet-process magnetic separator.

10. The separation plant as claimed in claim 9, further comprising a water supply system for said wet-process magnetic separator and said separation plant further including branch lines for supplying water to the differential crusher-flattener mill and to the vibratory screen of the combined course.

* * * * *